Figure 1:
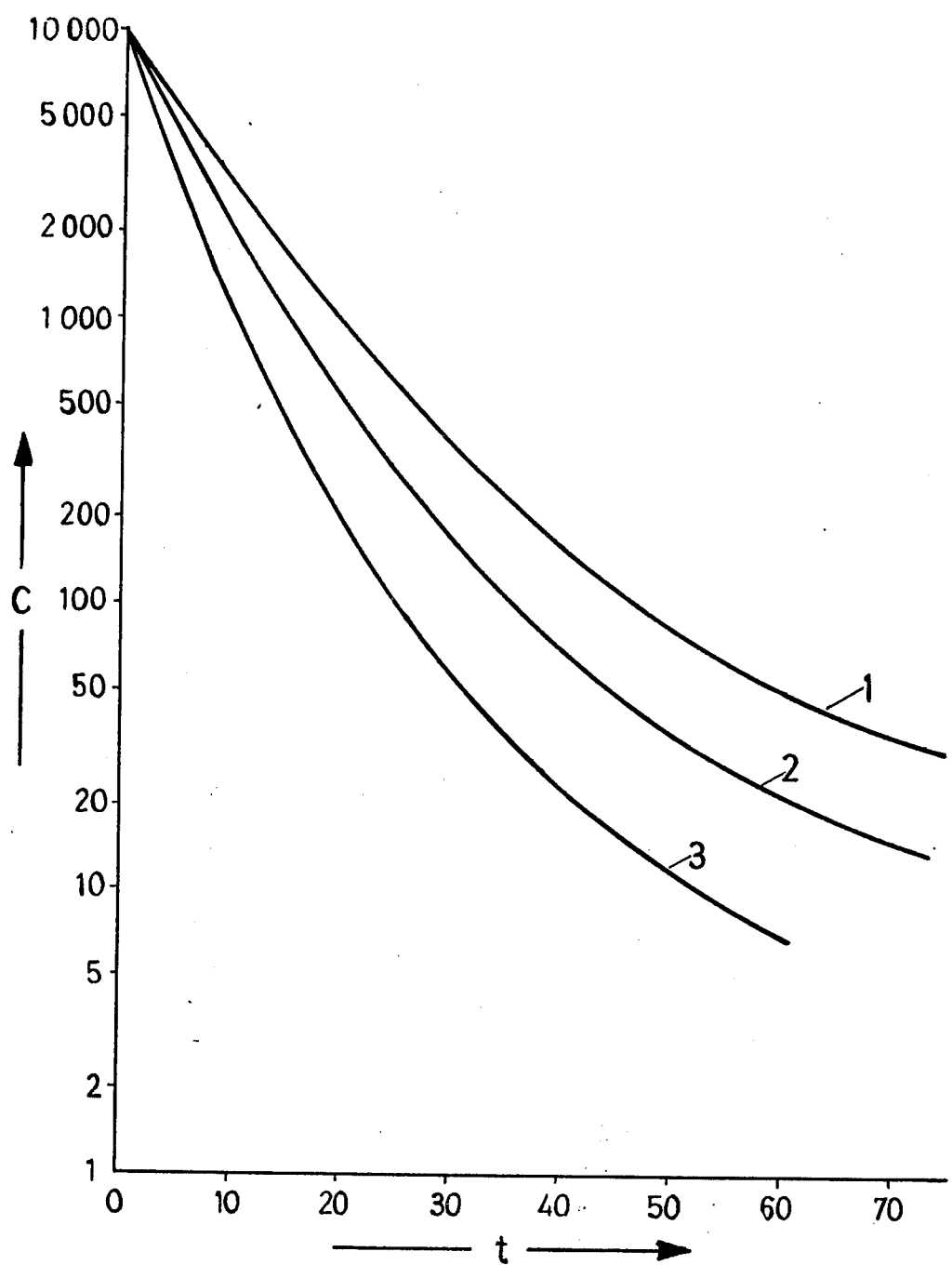

United States Patent [19]

Grosse-Wortmann et al.

[11] 4,017,445
[45] Apr. 12, 1977

[54] PROCESS FOR THE REMOVAL OF VINYL CHLORIDE FROM POLYVINYL CHLORIDE DISPERSIONS

[75] Inventors: Hans Grosse-Wortmann; Bernhard Hentschel, both of Marl; Peter Rauth, Bochum; Karl-Heinz Schoenberg, Marl; Bernd Terwiesch, Marl; Hermann Winter, Marl, all of Germany

[73] Assignee: Chemische Werke Huls Aktiengesellschaft, Marl, Germany

[22] Filed: Aug. 28, 1975

[21] Appl. No.: 608,791

[30] Foreign Application Priority Data

Aug. 29, 1974 Germany .......................... 2441303
Sept. 7, 1974 Germany .......................... 2442931

[52] U.S. Cl. .................. 260/29.6 R; 260/29.6 PT; 526/18; 528/500
[51] Int. Cl.$^2$ ........................................ C08L 27/06
[58] Field of Search ............... 260/29.6 R, 29.6 PT, 260/92.8 W, 92.8 A, 29.8 W; 526/71

[56] References Cited

UNITED STATES PATENTS

| 2,662,867 | 12/1953 | Hoertz | 260/80.81 |
| 3,052,663 | 9/1962 | Bodlaender et al. | 260/92.8 A |
| 3,129,132 | 4/1964 | Gudheim | 260/29.6 R |
| 3,371,059 | 2/1968 | Rich | 260/29.6 R |

FOREIGN PATENTS OR APPLICATIONS

| 1,248,943 | 8/1967 | Germany | 260/29.6 R |

*Primary Examiner*—M. J. Welsh
*Attorney, Agent, or Firm*—Millen & White

[57] ABSTRACT

Residual vinyl chloride contents of aqueous polyvinyl chloride dispersions is reduced to less than 50 ppm by withdrawing steam and vinyl chloride contained in a boiling aqueous polyvinyl chloride dispersion at a temperature of 80°–100° C. and at a vaporization rate per minute of 0.006–0.2 kg. steam per kg. of polyvinyl chloride for a period of time from 3–60 minutes until a vinyl chloride content of less than 50 p.p.m. is achieved.

9 Claims, 5 Drawing Figures

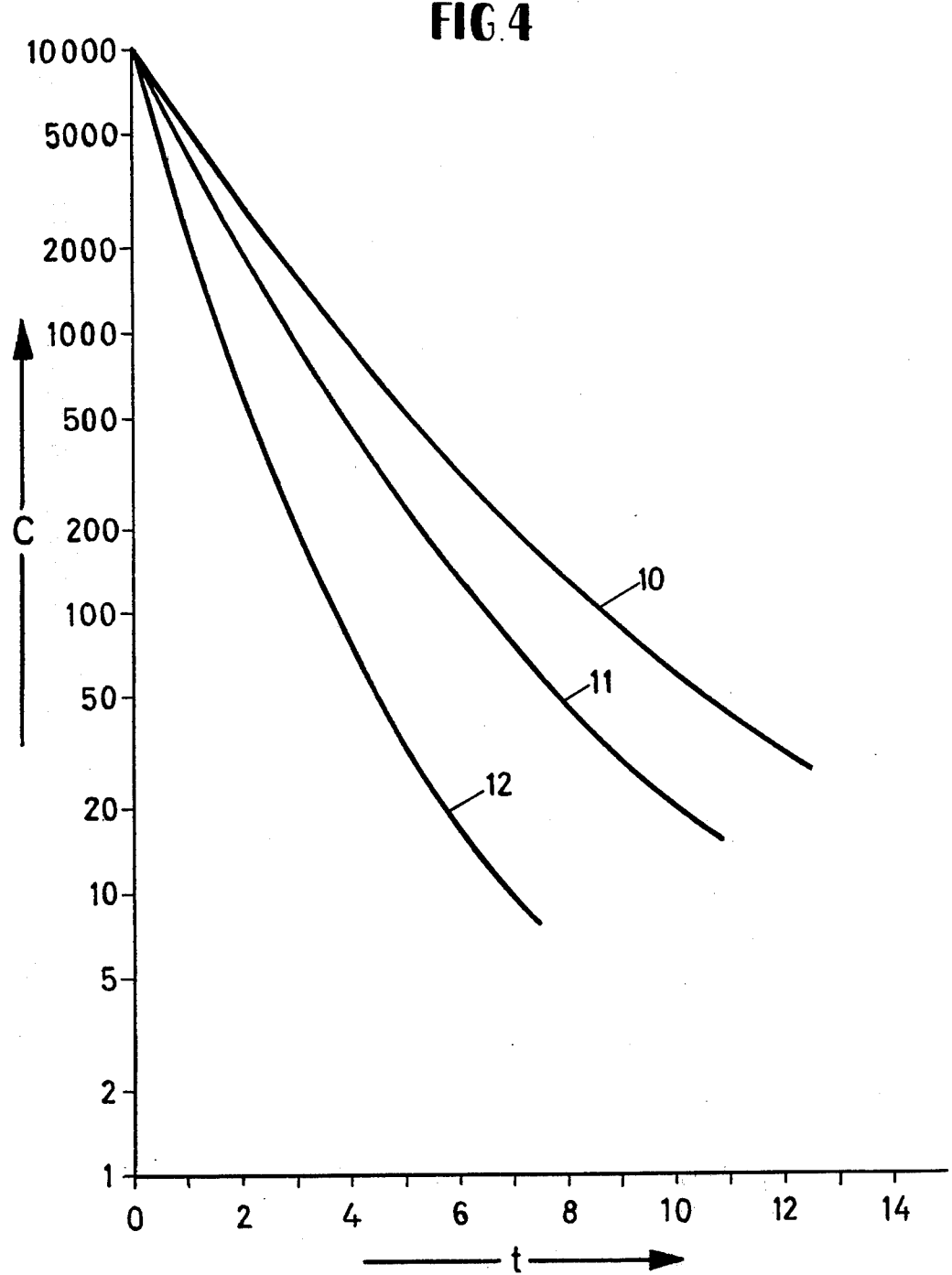

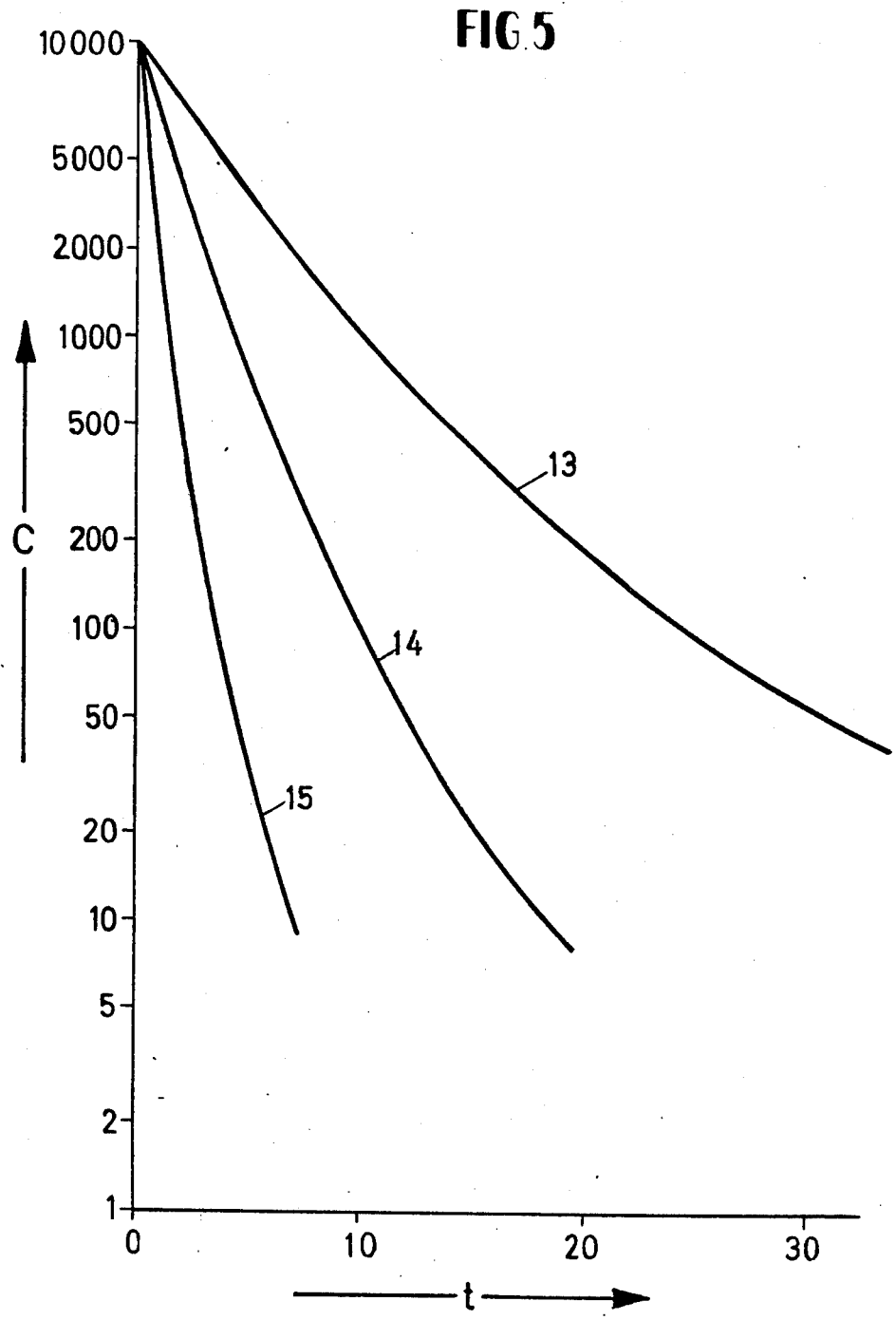

PROCESS FOR THE REMOVAL OF VINYL CHLORIDE FROM POLYVINYL CHLORIDE DISPERSIONS

BACKGROUND OF THE INVENTION

This invention relates to an economical and nonpolluting method of removing residual vinyl chloride from aqueous polyvinyl chloride dispersions.

The preparation of homopolymers, copolymers, and graft polymers of vinyl chloride by suspension or emulsion polymerization is well-known. See, for example, monograph by Kainer, "Polyvinyl-chlorid and Vinylchlorid-Mischpolymerisate", Springer publishers, Berlin/Heidelberg/New York, 1965, pp. 12 et seq. and 111 et seq.

Such polymerizations are customarily conducted to a conversion of only about 80–95% because at higher conversions the polymerization rate decreases greatly. Also the product quality can be disadvantageously affected. Consequently the unreacted monomeric vinyl chloride must be removed from the charge.

The residual vinyl chloride is predominantly either dissolved in the polymer or bound by adsorption to the surface of the polymer, especially in pores. Only a minor proportion is dissolved in the water, because of its lack of solubility. The pressure in the gas space, depending on temperature and conversion, is several atmospheres toward the end of the polymerization in the absence of inert gases, but ranges below the saturation pressure of vinyl chloride.

Subsequently to the polymerization, the dispersion is customarily expanded into a closed system to remove the unreacted vinyl chloride and the expanded vinyl chloride is recovered after separating entrained water therefrom in accordance with the pressure, in the absence of air by conventional methods (by compression). The degasified dispersion, which still contains up to 2% vinyl chloride, based on the polyvinyl chloride is subjected to a thermal processing step to obtain dry polyvinyl chloride powder. Optionally, a mechanical preliminary dewatering stage is interposed. In this thermal processing step the residual monomer still present in the dispersion is emitted to a large extent into the atmosphere in the dryer exhaust air, depending on the type of drying process employed, and thus contributes pollution.

Moreover, depending on the selected drying method and on the molecular weight and porosity of polymer, there still remains up to about 1,000 p.p.m of residual monomer in the polyvinyl chloride.

This high proportion of residual monomer is undesirable for various reasons. Dependent on the processing conditions to which the polyvinyl chloride is subjected, a more or less large proportion of the monomer is liberated during the processing operation and is again discharged into the atmosphere. Also problems of occupational hazards suffered by the personnel arise during processing and, under certain circumstances, the necessity of explosion protection exists.

A portion of the residual monomer content still remains in the polyvinyl chloride even after the processing operation, limiting the utilization of this product, particularly in the fields of grocery and beverage packaging. For example, in the United States, in Sweden, and in Holland, regulations limit the vinyl chloride content the packaging materials coming into contact with foodstuffs to a maximum of 10 p.p.m. residual.

The above factors create the problem of removing substantially all unreacted, monomeric vinyl chloride economically from aqueous polyvinyl chloride suspensions, prior to the drying step, so that the vinyl chloride is not emitted into the atmosphere but instead is recovered and reused, and that after the drying step the residual monomer in the polyvinyl chloride is insufficient to have a deleterious effect either during processing or to preclude use for foodstuff packaging.

Although it is known from Fed. Rep. of German Published Application F 11 325 to separate the monomer under the effect of steam from suspensions, also those of polyvinyl chloride, moderately elevated temperatures are expressly recommended for carrying out these steps. In the indicated example, the monomer removal from an aqueous polyvinyl chloride suspension with a residual vinyl chloride content of 6–7% takes place under a pressure of about 100 torr (mm. Hg), corresponding to a temperature of about 52° C. The description of the device utilized in this connection indicates a residence time is in the order of one minute. Accordingly, that Patent Application teaches the treatment of polyvinyl chloride dispersions with steam at moderately raised temperatures (52° C.) and residence times of at most one minute. As will be demonstrated in the examples set forth below, the residual monomer content can be lowered, at best, to several thousand p.p.m. under such conditions.

German Pat. No. 1,248,943 discloses a process for the discontinuous removal of volatile impurities from aqueous polymer dispersions wherein steam is conducted through the boiling polymer dispersion in a specially constructed apparatus, making it possible to effect the process even with strongly foaming emulsions. As suitable operating temperatures, the patent mentions, in general and without correlation to the type of polymer, 50°–100° C. (column 4, line 52). In the example, the reduction of the residual monomer content is described merely in connection with the aqueous dispersion of a copolymer of acrylic acid ester and styrene within 3 hours at 69° C., from 1.65% to 0.018%, based on the solids content. The amount of steam employed is about 1 kg. of steam per 1 kg. of solid matter or, expressed another way, about 0.0056 kg. of steam per kg. of solids and per minute. German Pat. No. 1,248,943 contains no teaching of how to free polyvinyl chloride dispersions of monomers by the use of comparatively high temperatures and high steam rates.

A process has now been surprisingly found for the removal of unreacted vinyl chloride from aqueous polyvinyl chloride dispersions to residual monomer contents of below 50 p.p.m. by the action of steam alone at comparatively high tempertures and high steam rates.

SUMMARY OF THE INVENTION

According to the process of this invention, residual vinyl chloride is removed from aqueous polyvinyl chloride dispersions with steam by withdrawing steam and vinyl chloride contained in a boiling aqueous polyvinyl chloride dispersion at a temperature of 80°–100° C. and at a vaporization rate per minute of 0.006–0.2 kg. steam per kg. of polyvinyl chloride for a period of time from 3–60 minutes until a vinyl chloride content of less than 50 p.p.m. is achieved.

DETAILED DISCUSSION

In a preferred embodiment, steam and vinyl chloride contained therein are withdrawn at a vaporization rate per minute of 0.05–0.2 kg. of steam per kg. of polyvinyl chloride.

In a specific embodiment, the aqueous polyvinyl chloride dispersion is heated continuously in an intermediate tank to temperatures of 80°–100° C., brought to boiling by adjusting the vapor pressure therewith and thereafter is fed to a degasification tower where additional steam is introduced countercurrently to the stream of boiling dispersion collectively from the intermediate tank and from the degasification tower, steam and vinyl chloride contained therein is withdrawn from the dispersion at a vaporization rate per minute of 0.006–0.2 kg. per kg. of polyvinyl chloride.

In a further specific embodiment, a partial stream of the aqueous polyvinyl chloride dispersion exiting from the degasification tower is recycled to the intermediate tank.

In conceiving the process of this invention, a not inconsiderable prejudice had to be overcome, since at the degasification temperatures employed herein substantial decomposition of the polyvinyl chloride could be anticipated. The road toward the utilization of higher temperatures had not been traveled heretofore because although one skilled in the art generally expects an acceleration of the diffusion by a temperature increase, the opposite effect has been described in the literature in case of polyvinly chloride. See F. Wolf, E. Kreter, "Zur Diffusion von monomerem Vinylchlorid in Polyvinylchlorid, Plaste und Kautschuk", (1974)

DRAWINGS

To further explain the mode of operation of the present invention, reference is made to the drawings in which FIGS. 1 to 5 are diagrams in which the concentration (C) of vinyl chloride in the polyvinyl chloride is plotted in p.p.m. logarithmically against degasification time in minutes.

The degasification curves 1 through 3 of FIG. 1 were obtained with a type of polyvinyl chloride of medium porosity under the following conditons:

| Temperature of the dispersion: | | 80° C. |
|---|---|---|
| Curve 1: | Vaporization rate: | 0.006 kg. steam/(kg. polyvinyl-chloride and minute) |
| Curve 2: | Vaporization rate: | 0.01 kg. steam/(kg. polyvinyl-chloride and minute) |
| Curve 3: | Vaporization rate: | 0.2 kg. steam/kg. polyvinyl-chloride and minute. |

The degasification curves 4–6 of FIG. 2 were obtained with a type of polyvinyl chloride of medium porosity under the conditions set forth below:

| Vaporization rate: | | 0.01 kg. steam/(kg. polyvinyl-chloride and minute) |
|---|---|---|
| Curve 4: | Temperature of dispersion: | 80° C. |
| Curve 5: | Temperature of dispersion: | 90° C. |
| Curve 6: | Temperature of dispersion: | 100° C. |

Figure 3:
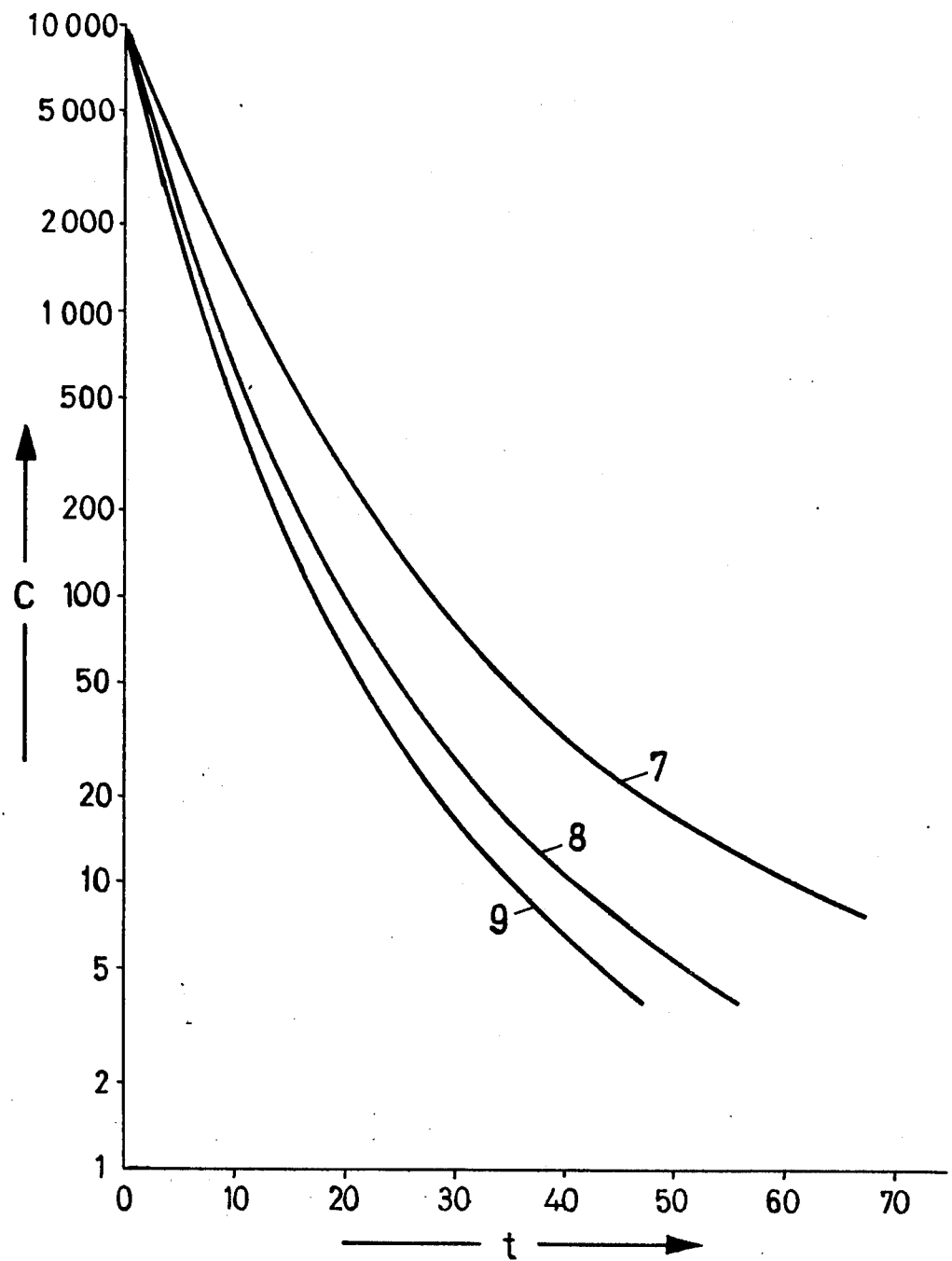

The degasification curves 7–9 of FIG. 3 were obtained each at a dispersion temperature of 90° C. and a vaporization rate of 0.01 kg. steam/kg. polyvinyl chloride/minute, employing different types of polyvinyl chloride, viz.,

| Curve 7: | a polyvinyl chloride of low porosity, |
|---|---|
| Curve 8: | a polyvinyl chloride of medium porosity, |
| Curve 9: | A porous soft polyvinyl chloride. |

The degasification curves 10–12 of FIG. 4 were obtained with a type of polyvinyl chloride of medium porosity under the following conditions:

| Temperature of dispersion: | | 100° C. |
|---|---|---|
| Curve 10: | Vaporization rate: | 0.05 kg. steam/(kg. polyvinyl chloride and minute) |
| Curve 11: | Vaporization rate: | 0.1 kg. steam/(kg. polyvinyl chloride and minute) |
| Curve 12: | Vaporization rate: | 0.2 kg. steam/(kg. polyvinyl chloride and minute). |

The degasification curves 13–15 of FIG. 5 were obtained with a polyvinyl chloride type of medium porosity under the following conditions:

| Vaporization rate: | | 0.2 kg. steam/kg. polyvinyl chloride and minute) |
|---|---|---|
| Curve 13: | Temperature of dispersion: | 80° C. |
| Curve 14: | Temperature of dispersion: | 90° C. |
| Curve 15: | Temperature of dispersion: | 100° C. |

The discovery that the degasification time can be shortened to the extent by increasing the vaporization rate is surprising, as will be explained with reference to FIG. 1. Curve 2 of the degasification curves shown as examples in FIG. 1, as well as the known solubility equilibrium between vinyl chloride and polyvinyl chloride at 80° C. yield the relationship set forth in the following table among partial vinyl chloride pressure, actual vinyl chloride concentration in the polyvinyl chloride, and equilibrium vinyl chloride concentration in the polyvinyl chloride:

| Time Min. | Partial Vinyl Chloride Pressure torr | Actual Vinyl Chloride Concentration p.p.m.(*) | Equilibrium Vinyl Chloride Concentration p.p.m.(*) |
|---|---|---|---|
| 1 | 11 | 9000 | 170 |
| 20 | 0.7 | 500 | 10 |
| 60 | 0.02 | 25 | 0.3 |

(*)mg. vinyl chloride/kg polyvinyl chloride

It can be seen from this table that the actual vinyl chloride concentration is 50 to 80 times above the equilibrium concentration. An increase in the vaporization rate reduces the partial vinyl chloride pressure and thus the associated equilibrium concentration of vinyl chloride in polyvinyl chloride. In contrast thereto, the difference between the actual and the equilibrium concentration of vinyl chloride in polyvinyl chloride remains practically unchanged. However, this difference in concentration should, as the motive force, be proportional to the mass transfer of the vinyl chloride from the solid matter into the surroundings, i.e., the dispersion water and also the available gas space, since the solubility equilibrium is set between these two phases.

It would appear from the foregoing that no reduction in the degasification time could be anticipated from an increase in the vaporization rate. However, as shown by comparison of curves 2 and 3 in FIG. 1, a considerable reduction in degasification time is accomplished by increasing the vaporization rate. This finding was entirely unexpected and means, in addition to establishing the applicability of higher temperatures of 80°–100° C, proves a further, surprising effect achieved by the mode of operation according to this invention. FIG. 1 shows furthermore that with a fixed (lowest) temperature of the dispersion of 80° C, the degasification goal of 50 p.p.m. vinyl chloride (starting with 10,000 p.p.m. in the polyvinyl chloride) can be achieved within the range of the vaporization rate of 0.006–0.2 kg steam/(kg polyvinyl chloride and minute) only with a degasification period of between 31 and 60 minutes, as seen from the points of intersection of curves 1 and 3 with horizontal line at 50 p.p.m. However, shorter degasification times are sufficient at higher temperatures. This is shown in FIG. 4, with an illustration corresponding to FIG. 1 but with a dispersion temperature of 100° C with vaporization per minute rates of 0.05–0.2 kg steam per kg polyvinyl chloride, degasification times are between 4.5 and 10.5 minutes.

Figure 2:
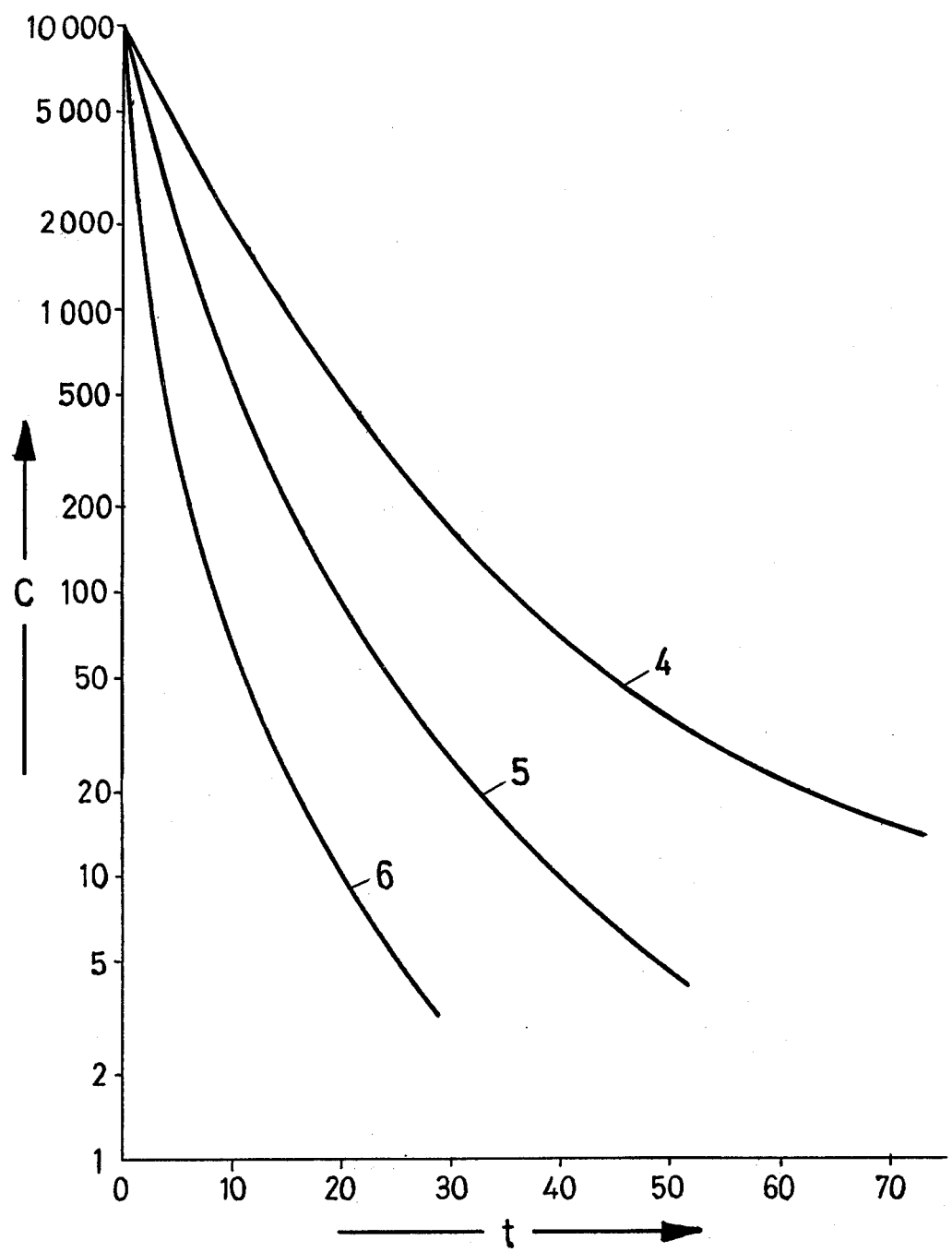

The degasification curves 4–6 in FIG. 2 show, on the other hand, that with a fixed (low) vaporization rate per minute of 0.01 kg vinyl chloride/kg polyvinyl chloride, a degasification period of 11–45 minutes is required at temperatures of 80°–100° C, in order to obtain, in case of initial concentrations of 10,000 p.p.m., residual vinyl chloride contents (in the polyvinyl chloride) of 50 p.p.m. or less. Using higher vaporization rates, shorter degasification times are sufficient for solving the posed problem. This is shown by FIG. 5 in a representation corresponding to FIG. 2. When using a vaporization rate per minute of 0.2 kg steam/kg polyvinyl chloride, degasification times are between 4.5 and 31 minutes at 80°–100° C.

Finally, it should be kept in mind that the degasification curves 1–3 in FIG. 1 and 4–6 in FIG. 2, 10–12 in FIG. 4 and 13–15 in FIG. 5 were obtained with respectively the same types of polyvinyl chloride.

FIG. 3 shows degasification curves of various types of polyvinyl chloride at the same temperature of 90° C and at a varporization rate of 0.01 kg steam/kg polyvinyl chloride and minute. A comparison of curves 7–9 in FIG. 3 makes it clear that the degasification time required to achieve residual vinyl chloride levels of 50 p.p.m. or less is dependent on the type of polyvinyl chloride, i.e., those of high porosity can be degasified more rapdily, as would be expected and those of lower porosity require longer degasification periods.

Thus, it can be seen from an observation of the degasification curves of FIGS. 1–5 in which way the vaporization rate, the temperature, the degasification time, and the type of polyvinyl chloride employed must be adapted to one another to obtain a residual monomer content based on polyvinyl chloride of 50 p.p.m. or less.

The amount of heat necessary to acheive the required vaporization rate is supplied to the dispersion by indirect heating and/or by the introduction of steam, preferably superheated.

The process of this invention can be conducted discontinuously or continuously. The discontinuous mode of operation can be accomplished in a simple agitator-equipped vessel. For the continuous method, it is advantageous to connect a degasification tower downstream of the agitator-equipped vessel. In order to increase the surface area of the dispersion, the degasification tower can be provided with flow diverting plates (baffles). When introducing the dispersion into the degasification tower, a pressure drop is naturally incurred. Steam, preferably superheated, is introduced countercurrently into the dispersion in the degasification tower and serves to maintain the necessary or selected temperature in the degasification tower and/or yields the amount of heat necessary for the required vaporization rate. In total, 0.006–0.2 kg steam per kg of polyvinyl chloride per minute is withdrawn from the dispersion in the intermediate tank (agitator-equipped vessel) and the degasification tower. Preferably, about 20–30% by weight of the steam is removed from the intermediate tank and about 80–70% by weight of the total steam is withdrawn from the degasification tower.

Suitably, the intermediate heating tank should be designed so that the aqueous polyvinyl chloride dispersion therein approximates the residence time distribution of a flow pipe. This can be attained by connecting several intermediate tanks in a cascade.

Polyvinyl chloride dispersions suitable for the process of this invention are suspensions of homopolymers, copolymers and graft polymers obtained by polymerization in an aqueous suspension.

In the preparation of the polymers, all customary, monomerisoluble catalysts, suspension stabilizers and optionally auxiliary suspension agents can be employed. Descriptions of such conventional polymerization methods, including the materials necessary for this purpose, can be found in the above-mentioned monograph by Kainer, pp. 12 et seq.

A description of conventional suspension stabilizers is set forth in pages 16–25 of the above references.

Particularly suitable are cellulose derivatives, such as cellulose ethers and esters, polyvinyl acetate, partially saponified polyvinyl acetate, polyvinylpyrrolidone copolymers of vinyl acetate and vinylpyrrolidone, copolymers of vinyl methyl ether and maleic anhydride, gelatin.

Suitable catalysts are all oil-soluble catalysts known suitable for suspension polymerization, e.g., mixed anhydrides of organic sulfoperacids and percarboxylic acids, e.g., acetylcyclohexylsulfonyl peroxide, organic peroxides, e.g., diacetyl, acetylbenzoyl, dibenzoyl, dilauroyl, 2,4-dichlorobenzoyl peroxide; peresters, such as isopropyl peracetate, tert.-butyl peracetate, tert.-butyl peroctoate, tert.-butyl perneodecanoate, tert.-butyl perpivalate; dialkyl peroxydicarbonates, e.g., diisopropyl, diethylhexyl, dicyclohexyl, diethylcyclohexyl, dicetyl, di-tert.-butycyclohexyl peroxydicarbonate; azo compounds, e.g., azobisisobutyronitrile and azabisdimethylvalerodinitrile. The catalysts can be employed individually or in mixtures. Conventional tensides can optionally be utilized as auxiliary suspension agents, e.g., alkali salts of long-chain alkyl sulfonic acids; alkali salts of alkylaryl sulfonic acids; esters or partial esters of glycol, glycerin, or of a polyol, e.g., sorbitol, with long-chain carboxylic acids; esters or partial esters of polycarboxylic acids, e.g., citric acid, itaconic acid, with longchain alcohols.

The dispersions employed in the process of this invention can also be obtained by polymerization in aqueous emulsion. For the production of such emulsion polymers, conventional water-soluble catalysts and emulsifiers can be used. Descriptions of known emulsion polymerization methods and the auxiliary agents used for this purpose can be found in the aforementioned Kainer monograph, pp. 34–59. It is also possible to use dispersions obtained by microsuspension polymerization (polymerization with preceding homogenization). In all cases where the dispersion contains an emulsifier and thus tends to foam due to low surface tension, defoamers can be added to prevent excessive foaming.

Suitable comonomers are primarily monoolefinic unsaturated compounds such as, for example, vinyl esters of straight-chain or branched carboxylic acids of 2–20, preferably 2–4 carbon atoms, e.g., vinyl acetate, vinyl propionate, vinyl butyrate, vinylidene chloride; as well as unsaturated acids, e.g., maleic, fumaric, itaconic, crotonic, acrylic, methacrylic acid, as well as the mono- or diesters thereof with monohydric and dihydric or alcohols of 1–10 carbon atoms; $\alpha$-olefins, such as, for example, ethylene, propylene, isobutylene, styrene; acrylonitrile; as well as polyunsaturated compounds, e.g., butadiene. The comonomers can be incorporated in the polymerization in amounts of 1–50% by weight, based on the copolymer.

Suitable materials for the graft polymerization are polybutadiene, polyvinyl propionate, natural rubber, copolymers of ethylene and vinyl acetate, copolymers of ethylene and propylene, terpolymers of ethylene, propylene, and unconjugated dienes, terpolymers of acrylonitrile, butadiene, and styrene, etc., wherein the starting materials can be 1–50% by weight, based on the total polymer.

The polymerization is customarily conducted, depending on the desired K-value, in agitator pressure autoclaves at the usual temperatures, i.e., 40°–70° C.

The starting polyvinyl chloride dispersions have vinyl chloride contents of more than 50 p.p.m., e.g., from 3,000 to 30,000 p.p.m., preferably at least 10,000 p.p.m.

Without further elaboration, it is believed that one skilled in the art can, using the preceding description, utilize the present invention to its fullest extent. The following preferred specific embodiments are, therefore to be construed as merely illustrative, and not limitative of the remainder of the disclosure in any way whatsoever.

PREPARATIONS

The types of polyvinyl chloride utilized in these examples were produced as follows:

(a) Production of a Low-Porosity Polyvinyl Chloride Type

In a pressure autoclave, 2700 parts of vinyl chloride is polymerized in the presence of 4650 parts of water, 0.7 part of gelatin (viscosity of a 5% aqueous solution at 60° C 5–6 cp.), and 0.2 part of dilauroyl peroxide at 55° C, under a pressure of 8 atmospheres gauge with agitation for a period of 8 hours. The autoclave is expanded to normal pressure and evacuated for 30 minutes to 150 torr. The thus-obtained polymer has a glassy appearance. K-value: 70.

(b) Production of a Medium-Porosity Polyvinyl Chloride Type 2450 parts of vinyl chloride is polymerized for 7 hours under agitation in the presence of 3300 parts of water, 0.14 part of a cellulose ether, 0.04 part of a partial ester of a polyol, and 0.2 part of dilauroyl peroxide at 58° C and a pressure of 8.6 atmospheres gauge. The autoclave is expanded to normal pressure and evacuated for 30 minutes to 150 torr. K-value: 68.

(c) Production of a Porous Polyvinyl Chloride (Soft Type)

In a pressure autoclave, 2700 parts of vinyl chloride are polymerized under agitation for 8 hours in the presence of 4650 parts of water, 0.2 part of a cellulose ether, 0.11 part of a partial ester of a polyol, and 0.2 part of dilauroyl peroxide at 55° C and under a pressure of 8 atmospheres gauge. The autoclave is expanded to normal pressure and evacuated for 30 minutes to 150 torr. K-value: 70.

EXAMPLE 1

In an agitator vessel having a capacity of 10 liters, 8 kg of an aqueous dispersion of polyvinyl chloride (obtained according to method (b) above, with a solids content of 30% by weight was degasified at 80° C and under the vapor pressure pertaining to this temperature. The necessary amount of heat per unit time was supplied by indirect heating. The amount of steam produced in the dispersion per unit time was measured by suction removal and concentration of the vapors. The vaporization rate was 0.006 kg steam per kg polyvinyl chloride per minute. At certain time intervals, samples were withdrawn from the dispersion in the stirrer vessel. The result of the degasification experiment is represented by curve 1 in FIG. 1. After 60 minutes, the vinyl chloride concentration in the polyvinyl chloride had dropped from 10,000 to 50 p.p.m.

EXAMPLE 2

The procedure of Example 1 was followed except the vaporization rate was increased to 0.01 kg steam/kg polyvinyl chloride/minute by increasing the heating power. Curve 2 in FIG. 1 shows that the degasification takes place faster than in Example 1.

EXAMPLE 3

The process disclosed in Example 1 was followed, except that steam was additionally fed to the dispersion via a filter plate. The vaporization rate was 0.2 kg steam/kg polyvinyl chloride/minute. Curve 3 in FIG. 1 shows that by raising the vaporization rate a considerable reduction of the degasification time can be attained.

EXAMPLE 4

The procedure of Example 2 was followed, i.e., a vaporization rate of 0.01 kg steam/kg polyvinyl chloride/minute at 80° C was employed. Curve 4 of FIG. 2 is thus identical to curve 2 of FIG. 1 and is again illustrated in FIG. 2 to explain the temperature dependency of the degasification step.

EXAMPLE 5

The method of Example 1 was followed except a temperature of 90° C and a vaporization rate of 0.01 kg steam/kg polyvinyl chloride/minute were employed.

Curve 5 of FIG. 2 shows a considerable shortening of the degasification period, compared to curve 4, as a result of the temperature increase.

EXAMPLE 6

The procedure of Example 1 was employed, except that a temperture of 100° C and a vaporization rate of 0.01 kg steam/kg polyvinyl chloride/minute were employed. The result is shown by curve 6 of FIG. 2. A comparison with curve 4 of FIG. 2 shows the considerable reduction in degasification time when employing a higher temperature.

EXAMPLE 7

The process of Example 5 was employed except a polyvinyl chloride obtained according to production method (a) was employed. Starting with 10,000 p.p.m. of vinyl chloride in the polyvinyl chloride, a residual monomer content of 50 p.p.m. was reached after 35 minutes, as demonstrated by curve 7 in FIG. 3.

EXAMPLE 8

The procedure of Example 5 was followed except a polyvinyl chloride obtained according to production procedure (b) was employed. Curve 8 of FIG. 3 is identical to curve 5 of FIG. 2 and is used to compare the types of polymers in FIG. 3.

EXAMPLE 9

The procedure of Example 5 was employed except a polyvinyl chloride was employed as produced according to method (c). As shown by curve 9 of FIG. 3, this porous polyvinyl chloride type requires the shortest degasification time of all of the various types.

EXAMPLE 10

The procedure of Example 1 was followed, except the degasification was carried out at a dispersion temperature of 100° C while additionally feeding steam via a filter plate. The vaporization rate was 0.05 kg of steam/kg polyvinyl chloride/minute. As shown by curve 10 in FIG. 4, the vinyl chloride concentration in the polyvinyl chloride dropped from 10,000 p.p.m. to 50 p.p.m. after 10.5 minutes.

EXAMPLE 11

The process disclosed in Examples 1 and 10 was followed, except the vaporization rate was 0.1 kg steam/kg polyvinyl chloride/minute. Curve 11 of FIG. 4 shows that the degasification time required for attaining a residual monomer content of 50 p.p.m. is shortened to less than 8 minutes.

EXAMPLE 12

The method of Examples 1 and 10 was used except the vaporization rate was 0.2 kg steam/kg polyvinyl chloride/minute. Curve 12 of FIG. 4 shows the progress of the degasification. A residual monomer content of 50 p.p.m. is achieved after 4.5 minutes.

EXAMPLE 13

Examples 1 and 3 were followed. The degasification proceeds as demonstrated by curve 13 of FIG. 5. Curve 13 in FIG. 5 is identical to curve 3 in FIG. 1 and is present to show the temperature dependency at the highest vaporization rate employed.

EXAMPLE 14

The procedure of Examples 1 and 3 was used except a dispersion temperature of 90° C was employed. As shown by curve 14 of FIG. 5, the degasification time to reduce the vinyl chloride content of the polyvinyl chloride from 10,000 p.p.m. to 50 p.p.m. is 12 minutes which is approximately 40% of the degasification time according to curve 13 (80° C, same vaporization rate).

EXAMPLE 15

The method of Examples 1 and 3 was used except a dispersion temperature of 100° C was employed. Curve 15 of FIG. 5 is identical to curve 12 of FIG. 4. The degasification time to reduce residual monomer content to 50 p.p.m. is 4.5 minutes.

EXAMPLE 16

An aqueous dispersion of polyvinyl chloride obtained according to method (b) and having a solids content of 25% by weight was continuously pumped from a storage tank into an agitator-equipped vessel having a capacity of 8 liters. In the stirrer vessel, the temperature of the dispersion was raised to 90° C by indirect heating with a heat-transport agent via a jacket. With an average residence time in the stirrer vessel of 40 minutes (corresponding to a throughput of 12 l. of dispersion per hour of 3kg of polyvinyl chloride per hour), the dispersion was introduced into the head of a degasification tower with baffles having a height of 2 meters and maintained at 88° C. The residence time in the degasification tower was 0.5 minute, which corresponds with a throughput of 12 l. of dispersion per hour, to a constant content of 0.1 liter. About 1 kg of steam per hour at a temperature of 100° C was introduced into the degasification tower from the bottom. The stirrer vessel and the degasification tower were connected to a vacuum system. The pressure was adjusted so that the dispersion in both devices was at the boiling point. The vaporization rate, according to a measurement of the thus-obtained condensate, was 0.01 kg steam/kg polyvinyl chloride/minute. With an initial concentration of 10,000 p.p.m. of vinyl chloride in the polyvinyl chloride, the dispersion exiting from the degasification tower contained, according to analysis by gas chromatography, 40 p.p.m. of vinyl chloride, on a solids basis.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the removal with steam of unreacted vinyl chloride, from aqueous polyvinyl chloride dispersions obtained by suspension or emulsion polymerizations of vinyl chloride, to residual monomer contents of less than 50 p.p.m., the improvement which comprises withdrawing steam and vinyl chloride contained in a boiling aqueous polyvinyl chloride dispersion maintained at a temperature of 80°–100° C., at a vaporization rate per minute of 0.006–0.2 kg steam per kg of polyvinyl chloride, for a period of time from 3–60 minutes until a vinyl chloride content of less than 50 p.p.m. is achieved.

2. A process according to claim 1 wherein the dispersion is maintained at 80°–100° C. by indirect heating.

3. A process according to claim 1, wherein the steam and vinyl chloride are withdrawn at a vaporization rate per minute of 0.05–0.2 kg per kg of polyvinyl chloride.

4. A continuous process according to claim 1, which comprises preheating a stream of the aqueous polyvinyl chloride dispersion to 80°–100° C in a heating zone, bringing a stream of heated dispersion to its boiling point by adjusting the vapor pressure thereof, transferring a stream of the boiling dispersion to a degasification zone, and passing steam countercurrently through the dispersion therein.

5. A process according to claim 4, wherein a partial stream of the dispersion discharged from the degasification zone is recycled to the heating zone.

6. A process according to claim 4, wherein the steam and vinyl chloride are withdrawn at a vaporization rate per minute of 0.05–0.2 kg per kg of polyvinyl chloride.

7. A process according to claim 1 wherein the dispersion is maintained at 80°–100° C. by both indirect heating and by introduction of steam into the dispersion.

8. A process according to claim 1 wherein the dispersion is maintained at 90° C.

9. A process according to claim 1 wherein the dispersion is maintained at 100° C.

* * * * *